United States Patent
Almanza Rubiano et al.

(10) Patent No.: US 8,633,130 B2
(45) Date of Patent: Jan. 21, 2014

(54) VANDIUM TRAPS FOR CATALYTIC CRACKING PROCESSES AND PREPARATION THEREOF

(75) Inventors: Luis Oswaldo Almanza Rubiano, Piedecuesta (CO); Luis Javier Hoyos Marin, Piedecuesta (CO); Cesar Augusto Vergel Hernández, Piedecuesta (CO)

(73) Assignee: Ecopetrol S.A., Bogota (CO)

( * ) Notice: Subject to any disclaimer, the term of this patent is extended or adjusted under 35 U.S.C. 154(b) by 593 days.

(21) Appl. No.: 12/518,044

(22) PCT Filed: Dec. 6, 2007

(86) PCT No.: PCT/IB2007/004328
§ 371 (c)(1),
(2), (4) Date: Mar. 8, 2011

(87) PCT Pub. No.: WO2008/081325
PCT Pub. Date: Jul. 10, 2008

(65) Prior Publication Data
US 2011/0152071 A1 Jun. 23, 2011

(30) Foreign Application Priority Data
Dec. 6, 2006 (CO) .................................. 06123223

(51) Int. Cl.
| | |
|---|---|
| *B01J 27/00* | (2006.01) |
| *B01J 23/02* | (2006.01) |
| *B01J 23/06* | (2006.01) |
| *B01J 23/70* | (2006.01) |
| *B01J 23/72* | (2006.01) |
| *B01J 23/00* | (2006.01) |
| *B01J 23/08* | (2006.01) |
| *C01F 7/02* | (2006.01) |

(52) U.S. Cl.
USPC ........... 502/208; 502/340; 502/341; 502/346; 502/355; 502/524; 423/626; 423/628; 423/629

(58) Field of Classification Search
USPC ................. 502/208, 340, 341, 346, 355, 524; 423/626, 628, 629
See application file for complete search history.

(56) References Cited

U.S. PATENT DOCUMENTS

| | | | |
|---|---|---|---|
| 3,957,897 A * | 5/1976 | Vrieland et al. ............... | 585/436 |
| 4,430,199 A | 2/1984 | Durante et al. | |
| 4,473,698 A | 9/1984 | Matsuda et al. | |
| 4,515,683 A | 5/1985 | Beck et al. | |
| 4,889,651 A | 12/1989 | Broze | |
| 4,895,636 A | 1/1990 | Chen et al. | |
| 4,900,428 A | 2/1990 | Mester | |
| 4,921,824 A | 5/1990 | Chin et al. | |
| 4,988,654 A | 1/1991 | Kennedy et al. | |
| 5,001,096 A | 3/1991 | Chu et al. | |
| 5,002,653 A | 3/1991 | Kennedy et al. | |
| 5,057,205 A | 10/1991 | Chin et al. | |
| 5,071,807 A | 12/1991 | Kennedy et al. | |
| 5,077,263 A | 12/1991 | Henzel | |
| 5,157,184 A | 10/1992 | Drezdzon et al. | |
| 5,304,299 A | 4/1994 | Kumar | |
| 5,324,416 A | 6/1994 | Cormier et al. | |
| 5,364,516 A | 11/1994 | Kumar et al. | |
| 5,603,823 A | 2/1997 | Kim | |
| 6,159,887 A | 12/2000 | Trujillo et al. | |
| 8,110,527 B2 * | 2/2012 | Liu et al. ....................... | 502/439 |

FOREIGN PATENT DOCUMENTS

EP 2 105 488 A2 * 9/2009 ............. C01G 11/00

* cited by examiner

Primary Examiner — Patricia L Hailey
(74) Attorney, Agent, or Firm — Merchant & Gould P.C.

(57) ABSTRACT

The invention relates to chemical compositions that can be used for hydrocarbon catalytic cracking processes with vanadium as a contaminant, including an active phase formed by different pyrophosphates M2P2O7 (M=Ba or Ca) supported on a mixture of magnesium and aluminum oxide, preferably magnesium aluminate in the spinel phase. The composition captures the metals originating from the charge, particularly vanadium, and thus protects the catalyst. Said composition is preferably used in the form of a separated particle in order to the control the addition thereof to the unit according to the metal content of the charge. The invention also relates to the method for preparing said composition, including synthesis of pyrophosphates, formation of a suspension of boehmite alumina, magnesium oxide or magnesium hydroxide, together with oxides M2P2O7, spray drying and calcination of the microspheres without generating any loss in the crystalline structure of oxides M2P2O7.

13 Claims, No Drawings

VANDIUM TRAPS FOR CATALYTIC CRACKING PROCESSES AND PREPARATION THEREOF

This application is a National Stage Application of PCT/IB2007/004328, filed 6 Dec. 2007, which claims benefit of Serial No. 06123223, filed 6 Dec. 2006 in Colombia and which application(s) are incorporated herein by reference. To the extent appropriate, a claim of priority is made to each of the above disclosed applications.

TECHNICAL FIELD

The present invention is addressed to chemical compositions capable of processing feedstocks with high metal content, particularly vanadium, in order to capture said metals in the presence of $SO_2$, and in that way preserve the activity and selectivity of the cracking catalysts in an industrial process unit. It is also a part of the invention the preparation method of these compositions which allow preserving the crystalline structure of their active phase (barium or calcium pyrophosphates), and which provide at the same time minimum physical properties for using it as additive in a commercial unit.

STATE OF THE ART

The irreversible loss of activity in the catalyst by the action of metals such as vanadium and sodium coming with the feedstock being one of the main operational problems of the fluid catalytic cracking units. This destruction of the catalyst which occurs under highly severe hydrothermal conditions of the regenerator not only diminishes yield of valuable products but significantly increases the production costs by increasing the fresh catalyst addition to the unit.

Two different approaches for solving this problem have been proposed in the literature, those who improve the resistance to vanadium on the individual components of the catalyst such as zeolites, and matrixes, and others in which vanadium traps are added to the catalyst inventory.

Among the different patented components in the literature the rare earth oxides are highlighted for being applied at an industrial level, specifically $La_2O_3$ (U.S. Pat. Nos. 5,603,823, 5,077,263, 5,001,096, 4,900,428, 4,515,683, 4,921,824, 5,304,299 and 5,364,516). The literature reports that additive RV4, a vanadium trap based on $La_2O_3$, has the ability to neutralize the destructive effect of vanadium in the equilibrium catalyst in only 20%, this was observed in different commercial applications.

Other industrially used active components, but from which there are no available results for their commercial application, correspond to alkaline earth metal oxides such as MgO and CaO, pure or mixed with materials containing calcium and magnesium such as dolomite, septiolite, added to the catalyst formulation, (U.S. Pat. No. 4,988,654) or as additives in independent particles (U.S. Pat. Nos. 5,002,653 and 5,071,807).

To the above information it can add that quite a part of the periodic table of elements has been patented as active components of vanadium trap in elemental form or associated oxides and phosphates.

Now, the active components for vanadium traps cannot be added by themselves into an industrial unit. These can be added to the catalyst during its preparation process for forming an integral particle or be deposited on a support to for forming an independent particle. The use of an independent particle chemical composition presents the advantage of being able to be added into the system according to the needs of the unit.

An independent particle vanadium trap is a catalytic cracking chemical composition (fluid catalytic cracking, FCC) and as such must have the same characteristics as that of an FCC catalyst, that is: size, size distribution, shape, and mechanical strength for supporting the extreme industrial conditions that exist in an industrial unit, and may be the most important property in a catalyst wick is the sufficiently exposed active area, that is the maximum dispersion and accessibility of the active compound.

A chemical composition having these characteristics is basically constituted by three components: a support, an active phase and a binder. The support is useful for providing the trap mechanical strength and texture properties such as specific surface area, pore volume, and average pore diameter. The binder's function as its name indicates is maintaining a firm cohesion between the support and the active component, thus securing the morphologic and mechanical strength properties to the attrition of the final product.

The adequate selection of the support and binder of the chemical composition is determinant for its reliability in the industrial unit, because in both cases the interaction active component-binder, or active component-support can give rise to forming new inactive compounds for catching vanadium.

From the above, it is evident that the use of vanadium traps is not new in the literature, nevertheless and despite of the existence of a long list of substances capable of neutralizing the vanadium effect, in the great majority of the cases their results are promising only at a laboratory scale. The discrepancy with the industrial application has been attributed to the presence of sulphur compounds SOx in the commercial operation which interferes with the ability of the traps to catch vanadium.

Some of the more promising components in the laboratory were reported in the U.S. Pat. No. 6,159,887 which discloses different phosphorous inorganic compounds such as $M(PO_3)_2$, $M_2P_2O_7$, $M_3(PO_4)_2$, $M_{10}(OH)_2(PO_4)_6$, $M(H_2PO_4)_2$, $MHPO_4$, $3M_3(PO_4)_2.MCO_3$, $M(H_2PO_2)_2$, $MHPO_3$, $M(PO_2)_2$, $M_2P_2O_7$, $M_3(PO_4)_2$, $M_{10}(OH)_2(PO_4)_6$, $M(H_2PO_4)_2$, $MHPO_4$ $3M_3(PO_4)_2.MCO_3$, $M(H_2PO_2)_2$, $MHPO_3$, $M(PO_2)_2$, $M_2P_2O_6$ and $A(PO_3)_3$ where M represents a bivalent metal such as: Be, Mg, Ca, Sr, Ba, Zn, Cd and Pb, and A represents a trivalent metal such as Al, Ga, In, As, Sb, Bi, La, Ce, Pr, Nd, Pm, Sm, Eu, Gd, being able to neutralize the vanadium in the form of stable $V^{iv}$ and $V^v$ compounds. According to said application, the phosphorousous compounds which show the best results for direct application for vanadium immobilization in the cracking catalysts, are $Ba(PO_3)_2$, $Ba_2P_2O_7$, $Ba_3(PO_4)_2$, $Ba_{10}(OH)_2(PO_4)_6$ and mixtures thereof.

It has been reported that barium (PBA) and calcium (PCA) pyrophosphates are capable of neutralizing the destruction effect of vanadium through a REDOX mechanism, mechanism which is different to that reported in the literature, wherein the basic active components react with acidic vanadium oxides. This property would avoid unwanted neutralization reaction of the active component by the sulphur oxides SOx present in an industrial regenerator.

U.S. Pat. No. 6,159,887 also reports PBA and PCA traps preparation through their deposition on different supports such as: alumina, silica, magnesium oxide, alumina silicate, among others. Different preparations made with said active agents and supports in the cited patent allowed us to observe that PBA supported on silica, alumina or silica-alumina totally decomposes towards different types of phosphates such as $Ba_3(PO_4)_2$, $AlPO_4$, $BaHPO_4$, and $Ba_8Al_2O_{11}$, oxides which do not show any capacity to catch vanadium in the presence of SOx so that the trap turns to be useless. In addition to what has been mentioned, in the case of MgO as support, it shows a low surface area and a high tendency to sintering in the presence of water, thus trap elaboration with this support is not convenient.

On the other hand trap preparation based on PBA using different binders such as chlorhydrol or sodium silicate allowed to show through DRX diffraction spectrum analysis that PBA decomposes in these preparations resulting in different aluminum and silica oxides with phosphorousand barium.

These precedents lead to establish that in the state of the art there is no solution to all the inconvenients involved in preparing vanadium traps based on barium and calcium pyrophosphates for the catalytic cracking process, as they present a high reactivity with the hydroxyl groups of the supports usually used such as alumina and silica, which leads to destruction of these phosphates and prevents the production of effective traps.

As PBA or PCA are some of the most promising agents for capturing vanadium in the presence of SOx, at least in the laboratory, it would be desirable to have a trap or method that allows the production of a trap which overcomes the previously mentioned inconvenients.

The present invention provides a formulation and a method for preparing vanadium traps which not only overcomes the above exposed inconvenients but proves to be capable of protecting the catalyst while processing heavy feedstocks in catalytic cracking units, better than any other catalyst existing in the state of the art.

DESCRIPTION OF THE INVENTION

The claimed invention of the present application is useful in hydrocarbon catalytic cracking process where the vanadium present in the feedstocks poisons and destroys the catalyst components used in the process, reducing their activity and the yield of valuable products such as gasoline. In order to avoid catalyst poisoning and destruction it is necessary to use additives which compete with the catalyst for vanadium. The applicant has established that applying PBA or PCA supported on an aluminum or magnesium based matrix allow them to react with vanadium forming stable compounds under the conditions of the catalytic cracking process, in which the vanadium is stabilized in its IV and V oxidation states.

Thus, a first aspect of this invention provides a chemical composition useful in a hydrocarbon catalytic cracking process that contain vanadium as a contaminant characterized in that it comprises pyrophosphates $M_2P_2O_7$ (wherein M=Ba or Ca) and an aluminum oxide support combined with different magnesium compounds such as MgO, $Mg(OH)_2$ or any soluble salt such as $Mg(NO_3)_2$.

Specifically, this invention refers to compositions comprising barium or calcium pyrophosphates and a magnesium aluminate support in its spinel phase.

The composition of the invention is characterized in that it comprises 10 to 60% by weight of barium or calcium pyrophosphates with respect to the total weight of the composition, 60 to 90% by weight of aluminum oxide with respect to the total weight of the composition, and 10 to 40% by weight of magnesium oxide with respect to the total weight of the composition. Preferably it comprises 30% of barium or calcium pyrophosphates with respect to the total weight of the composition, 55% by weight of aluminum oxide with respect to the total weight of the composition and 15% by weight of magnesium oxide with respect to the total weight of the composition.

In a second aspect, the application is also oriented to the method for producing the composition of the invention, which comprises:

Preparing the pyrophosphate through calcination of its precursor salts $BaHPO_4$ or $CaHPO_4$, produced by co-precipitation of two solutions, the first a phosphorous source, such as $(NH_4)_2HPO_4$ or $H_3PO_4$, and the second a source of Ba or Ca of the nitrate or chloride type, selected from $(Ba(NO_3)_2$ and $BaCl_2$. Co-precipitation is carried out by adding a $NH_4OH$ solution to the above solutions until pH is above 7.5 with high speed agitation in order to obtain $BaHPO_4$ or $CaHPO_4$ having a particle size of less than 1 μm. These solids are then calcinated at temperatures between 750 and 820° C. to obtain PBA and PCA respectively with particle sizes of around 1 μm.

Separately preparing the support through partial dissolution of aluminum oxide, preferably bohemite type aluminum hydroxide, in the presence of an inorganic acid such as $HNO_3$, HCl or organic such as acetic acid, formic, among others. After an ageing time an MgO or magnesium hydroxide suspension is added to the alumina suspension, adjusting the pH over 4.0, preferably over 4.5 by adding an $NH_4OH$ solution.

Then adding a PBA or PCA suspension, obtained as was described, to the support of the previous step and finally, the resulting suspension is dried by aspersion in order to obtain vanadium trap microspheres having the mechanical strength needed to be used in the industrial process.

Using this procedure the crystalline structure of the active phase is maintained with a maximum of its capacity to catch vanadium. This form of immobilization of the vanadium has advantages over the traditional mechanism of acid-base, because it avoids or minimizes the competition of sulfuric acid for the vanadium traps used normally.

The following examples are given to illustrate the objectives and advantages of this invention. Nevertheless, they do not intend to limit the scope of the present invention.

EXAMPLE 1

For preparing 80 g of the prototype the following is used:

| | |
|---|---|
| bohemite type aluminum hydroxide | 100 g. |
| 98% formic acid | 55.1 g. |
| Sodium hexametaphosphate $(NaPO_4)_6$ | 0.3 g. |
| demineralized water | 178.2 g. |

The dispersant agent $(NaPO_4)_6$ is added to water, then formic acid is added, followed by aluminum hydroxide to form a 30% suspension by total weight of the composition, and then it is vigorously agitated. Finally, the pH is adjusted by adding concentrated ammonium hydroxide to a value over 4.5.

The final suspension is taken to the dryer loading container. The dried and sieved final prototype is calcinated in a muffle furnace at a temperature between 750 and 820° C. for 2 hours.

EXAMPLE 2

For preparing 133.3 g of the prototype the following is used:

| | |
|---|---|
| bohemite type aluminum hydroxide | 112.15 g. |
| MgO in suspension | 20 g. |
| 98% formic acid | 29.5 g. |
| Sodium hexametaphosphate (NaPO$_4$)$_6$ | 0.4 g. |
| demineralized water | 200 g. |

The dispersant agent (NaPO$_4$)$_6$ is added to water, then formic acid is added, followed by aluminum hydroxide to form a 30% suspension by total weight of the composition, and then it is vigorously agitated. Then the MgO suspension is added and the mixture is vigorously agitated. Finally, the pH is adjusted by adding concentrated ammonium hydroxide to a value over 4.5.

Finally, the suspension is taken to the dryer loading container. The final dried and sieved prototype is calcinated in a muffle furnace at a temperature between 750 and 820° C. for 2 hours.

EXAMPLE 3

For preparing 153.3 g of the prototype the following is used:

| | |
|---|---|
| bohemite type aluminum hydroxide | 112.15 g. |
| MgO in suspension | 40 g. |
| 98% Formic acid | 29.5 g. |
| Sodium hexametaphosphate (NaPO$_4$)$_6$ | 0.4 g. |
| demineralized water | 200 g. |

The dispersant agent (NaPO$_4$)$_6$ is added to water, then formic acid is added, followed by aluminum hydroxide to form a 30% suspension by total weight of the composition, and then it is vigorously agitated. Then the MgO suspension is added and the mixture is vigorously agitated. Finally, the pH is adjusted by adding concentrated ammonium hydroxide to a value over 4.5.

The final suspension is taken to the dryer loading container. The final prototype dried and sieved is calcined in a muffle furnace at a temperature between 750 and 820° C. for 2 hours.

EXAMPLE 4

For preparing 50 g of the prototype the following is used:

| | |
|---|---|
| bohemite type aluminum hydroxide | 53.5 g. |
| PBA with particle size less than 1 μm | 15 g. |
| 98% Formic acid | 29.5 g. |
| Sodium hexametaphosphate (NaPO$_4$)$_6$ | 0.1606 g. |
| demineralized water | 95.4 g. |

The dispersant agent (NaPO$_4$)$_6$ is added to water, then formic acid is added, followed by aluminum hydroxide to form a 30% suspension by total weight of the composition, and then it is vigorously agitated. Then the pH of the suspension is increased to 4.0 by adding a concentrated ammonium hydroxide solution. In parallel PBA is placed in suspension with water, 1/1 ratio, and vigorously agitated.

The PBA suspension is added to the aluminum hydroxide one agitating continuously for 1 minute.

The final suspension is taken to the dryer loading container. The final dried and sieved prototype is calcinated in a muffle furnace at a temperature between 750 and 820° C. for 2 hours.

EXAMPLE 5

For preparing 133.3 g of the prototype the following is used:

| | |
|---|---|
| aluminum hydroxide type bohemite | 112.5 g. |
| PBA with particle size less than 1 μm | 40 g. |
| MgO in suspension | 20 g. |
| 98% Formic acid | 29.5 g. |
| Sodium hexametaphosphate (NaPO$_4$)$_6$ | 0.4 g. |
| demineralized water | 200 g. |

The dispersant agent (NaPO$_4$)$_6$ is added to water, then formic acid is added, followed by aluminum hydroxide to form a 30% suspension by total weight of the composition, and then it is vigorously agitated. Then the MgO suspension is added continuing with vigorous agitation. Then the pH of the suspension is adjusted over 4.0 by adding a concentrated ammonium hydroxide.

Finally PBA in a powder form is added with continuous agitation.

Finally, the suspension is taken to the dryer loading container. The final dried and sieved prototype is calcinated in a muffle furnace at a temperature between 750 and 820° C. for 2 hours.

Trap Evaluation Under Hydrothermal Conditions

Fresh commercial catalyst mixtures CATF and vanadium trap prototypes at 10% by weight are impregnated with 0.6% by weight of vanadium through incipient impregnation from a vanadium source (3.4% vanadium enriched gasoil) dissolved in cyclohexane. The solids are calcinated in a muffle furnace, initially heating to a temperature of 120° C., maintaining this temperature constant during 2 more hours.

Then the temperature is rapidly increased at a rate of 10° C./min up to 600° C. and the solid is left at this temperature for 2 more hours.

After calcination, the CATF samples with or without vanadium and the CATF/prototypes/0 g) mixtures are placed in a continuous flow and fixed bed reactor under dry air stream. The solid is heated gently 3-4° C./min up to 815° C. Once this temperature has been reached air is passed through a saturator which maintains liquid water at a constant temperature of 45° C. Under these conditions the air stream is saturated with 18% water (molar fraction), which stream is passed through the catalyst bed during 20.5 hours. At the end of this period the deactivating stream is changed to dry nitrogen during one more hour at the same temperature, then proceeding to rapidly cool the system to room temperature, maintaining the dry nitrogen flow.

Tables 1 and 2 present the characterization of the traps prepared according to examples 1 to 5 previously described and the results of the MAT micro activity analysis of the mixtures after deactivation.

TABLE 1

Prototype characterization

| COMPOUND OR CHARACTERISTIC | EXAMPLE | | | | |
|---|---|---|---|---|---|
| | 1 | 2 | 3 | 4 | 5 |
| wt % Aluminum hydroxide | 100 | 78.5 | 57 | 70 | 55 |
| wt % PBA | 0 | 0 | 0 | 30 | 30 |
| wt % MgO | 0 | 21.5 | 43 | 0 | 15 |
| CHARACTERIZATION | | | | | |
| $N_2$ Adsorption BET area m$^2$/g | 183 | 219.9 | 187 | 160.4 | 158 |
| Pore volume cc/g | 0.74 | 0.71 | 0.6 | | 0.44 |
| Dp A° | 120 | 98 | 104 | | 67.5 |
| DRX (X ray diffraction) | | | | 0.0 | 18 PBA |
| % PBA ** | | | Spinel | $AlPO_4$ | $Ba_3(PO_4)_2$ |
| | | Spinel | $MgAl_2O_4$ | $BaHPO_4$ | $Ba_2Mg(PO_4)_2$ |
| Phases present | $Al_2O_3$ | $MgAl_2O_4$ | MgO | $Ba(PO_3)_2$ | |

** Measured from the intensity of the PBA reflexion in DRX to values of 2θ = 23° and compared with the intensity of pure PBA.

TABLE 2

MAT results from CATF with or without vanadium, and CATF mixtures with the prepared prototypes in the different examples and with no presence of $SO_2$

| Yield % weight | CAT 0% V | CAT 0.6% V | 1 | 2 | 3 | 4 | 5 |
|---|---|---|---|---|---|---|---|
| $H_2$ | 0.1 | 0.6 | 0.7 | 0.3 | 0.5 | 0.4 | 0.2 |
| Dry gas | 4.7 | 3.4 | 2.0 | 1.6 | 2.9 | 1.5 | 1.4 |
| LPG | 16.4 | 11.3 | 10.0 | 9.8 | 9.2 | 8.3 | 9.5 |
| C5-220° C. | 48.7 | 41.5 | 44.8 | 51.6 | 44.9 | 48.8 | 49.9 |
| ALC | 15.3 | 20.7 | 22.3 | 20.2 | 22.0 | 22.4 | 21.1 |
| Clarif. Oil | 5.9 | 16.3 | 13.1 | 8.9 | 14.4 | 11.8 | 10.6 |
| Coke | 8.9 | 6.7 | 7.8 | 7.9 | 6.6 | 7.3 | 7.5 |
| Conversion X % | 78.8 | 63 | 64.6 | 71 | 63.6 | 65.8 | 68.3 |
| LPG + gasoline | 65.2 | 52.8 | 54.8 | 61.4 | 54.2 | 57 | 59.4 |
| % Protection Gasoline + LPG | 100 | 0 | 16.0 | 69.1 | 10.5 | 33.8 | 53.2 |
| % protection Zeolite area | 100 | 0 | 26.6 | 77.2 | 32 | 48.1 | 64 |

From the results shown in these two tables it can be observed that the supports by themselves, be it alumina or mixtures of alumina-MgO, have properties as vanadium traps under hydrothermal conditions.

When mixtures of 21.5 wt. % MgO and 78.5 wt. % alumina are used, it can be observed the formation of the spinel phase of magnesium aluminate with protection on valuable products (Gasoline+GLP) of 69.1, but when there is an excess of MgO in the mixture, as occurred in example 3, the protection on valuable products lowers to 10.5%. The latter is a proof of the harmful effect of a free phase of MgO in the spinel phase of magnesium aluminate.

Another interesting aspect of the prototype in example 4 is that besides the fact that PBA has been completely destroyed in this preparation, a protection that is above the observed protection in pure alumina can be seen.

Also it is worth highlighting that the best protective properties are exhibited in the combination of aluminum and MgO in example 2 and the additive formulations of the invention which were produced by example 5.

Trap Evaluation Through CPS Cycles in Presence of $SO_2$.

The mixtures of commercial catalyst, trap and 8000 ppm of vanadium (100 g) are submitted in a fluidized bed to a reduction-oxidation cyclic deactivation process (40 cycles).

After burning in a muffle furnace and after reaching the deactivation temperature, a nitrogen stream is passed through the bed during 10 minutes in order to evacuate the oxygen adsorbed on the catalyst. In a second step a stream comprising 50% by volume of propylene and 50% by volume of steam is passed through the fluidized bed of catalyst for another 10 minutes. Then the catalyst is evacuated once again with a nitrogen stream during 10 minutes, to be finally treated with a stream comprising 50% by volume of air containing 4% by volume of $SO_2$ by volume and 50% by volume of steam. This procedure in repeated 40 times. During the whole procedure the temperature remains constant at 788° C.

Table 3 shows the MAT micro activity results of the catalyst with 0.8% by weight of vanadium, of the catalyst with no vanadium, and of the catalyst mixtures with 10 wt. % of the different prototypes prepared, mixtures that have been impregnated with 0.8% by weight of vanadium.

TABLE 3

MAT micro activity results of deactivated solids in REDOX cycles in the presence of $SO_2$

| Yield % weight | CAT | CAT 0.8% p V | 1 | 2 | 5 |
|---|---|---|---|---|---|
| H2 | 0.17 | 0.20 | 0.4 | 0.45 | 0.19 |
| Dry gas | 1.7 | 0.77 | 1.2 | 1.32 | 0.87 |
| LPG | 11.6 | 4.5 | 4.3 | 5.1 | 7.0 |
| C5-220° C. | 49.4 | 38.2 | 36.5 | 34.4 | 44.8 |
| ALC | 21.2 | 25.5 | 26.4 | 26.4 | 25.2 |
| Clarif. Oil | 11.5 | 27.1 | 26.7 | 26.6 | 17.2 |
| Coke | 4.6 | 3.9 | 4.4 | 6.3 | 4.9 |
| Conversion X % | 67.3 | 47.4 | 46.8 | 47.1 | 57.6 |
| LPG + gasoline | 61 | 42.7 | 40.8 | 39.5 | 51.7 |
| % Protection Gasoline + LPG | 100 | 0.0 | 0.0 | 0.0 | 49.3 |
| % protection area Zeolite | 100 | 0.0 | 0.0 | 0.0 | 20.1 |

From the results shown, it can be highlighted how the support constituted by alumina, or mixtures of alumina and Magnesium oxide, different from the deactivations with water steam and air, when in presence of $SO_2$ (2% molar in air) do not show any type of capability to capture vanadium. This explains why the solids reported in the state of the art as vanadium traps, do not act as such in the presence of $SO_2$ (similar scenery as that of the industrial unit).

On the contrary, the solid comprised by PBA supported on the mixture of aluminum oxide and magnesium oxide, mixed with commercial catalyst and vanadium, and in the presence of SO2 approximately maintains the same capacity for protecting the yields on valuable products observed in hydrothermal deactivations.

The invention claimed is:

1. A chemical composition useful in a hydrocarbon catalytic cracking process that contain vanadium as a contaminant, the composition comprising pyrophosphates $M_2P_2O_7$ wherein M is Ba or Ca, and a magnesium aluminate support in its spinel phase.

2. A chemical composition according to claim 1, comprising 10% to 60% by weight of barium or calcium pyrophosphates.

3. A chemical composition according to claim 2, comprising 30% by weight of barium or calcium pyrophosphate.

4. A process for preparing the chemical composition according to claim 1, comprising:
   adding a barium pyrophosphate or calcium pyrophosphate suspension to a magnesium aluminate support in its spinel phase,
   and drying the barium pyrophosphate or calcium pyrophosphate suspension through aspersion.

5. The process for preparing the chemical composition according to claim 4, wherein the magnesium aluminate support in its spinel phase is obtained by: partially dissolving aluminum oxide in the presence of an inorganic acid or an organic acid, forming an aluminum oxide suspension,
   adding a suspension of MgO or $Mg(OH)_2$ to the aluminum oxide suspension, and adjusting the pH to greater than 4.5 by adding an $NH_4OH$ solution.

6. A process according to claim 5 wherein the organic acid is formic acid.

7. A process according to claim 5, wherein the amount of aluminum oxide is between 60% and 90% by weight of the total composition.

8. A process according to claim 5, wherein the amount of magnesium oxide is between 10% and 40% by weight of the total composition.

9. A process according to claim 5, further comprising adding a dispersant agent to the barium pyrophosphate or calcium pyrophosphate suspension.

10. The process according to claim 9 wherein the dispersant agent is $(NaPO_4)_6$ in a concentration from 0.1 to 2% by weight of the total composition.

11. The process according to claim 5, wherein the aluminum oxide is alumina.

12. The process according to claim 11, wherein the inorganic acid is $HNO_3$ or HCl.

13. The process according to claim 12, wherein the organic acid is acetic acid.

* * * * *